Nov. 13, 1928.
R. S. CLARK
1,691,542
VALVE SEAL FOR REVOLUBLE STEM VALVES
Filed March 24, 1926
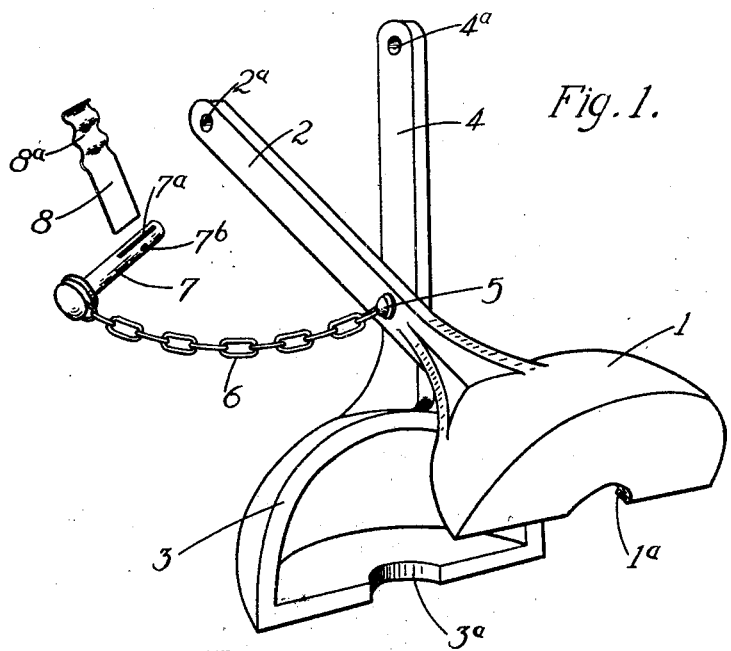
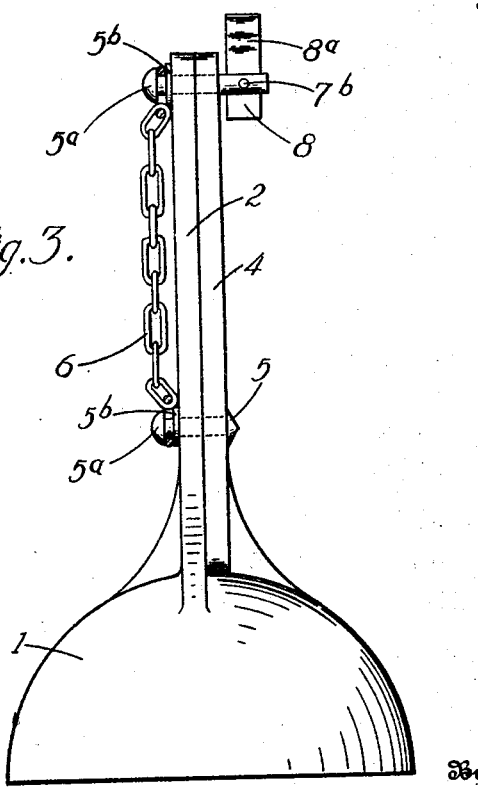
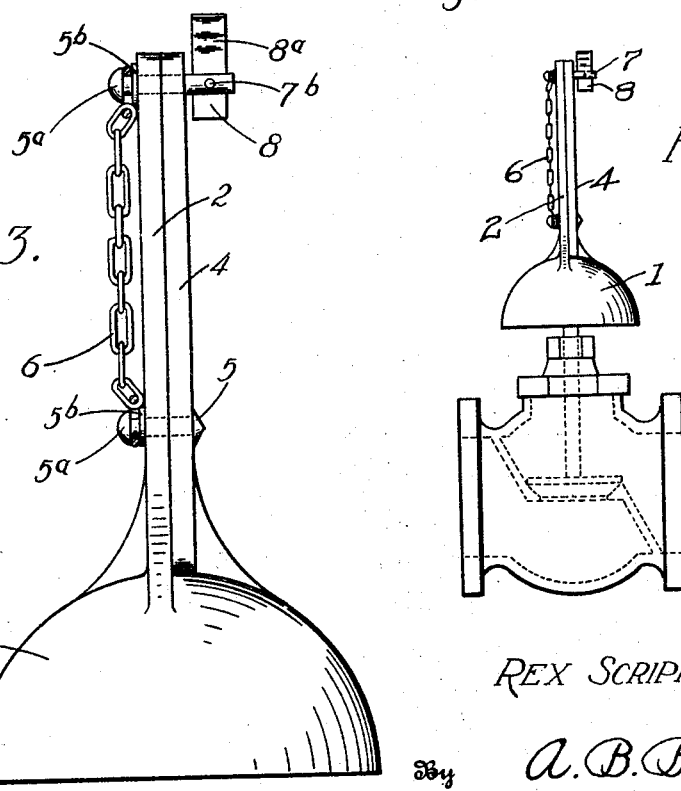
Inventor
REX SCRIPPS CLARK
By A. B. Bowman
Attorney Patented Nov. 13, 1928.

1,691,542

UNITED STATES PATENT OFFICE.

REX SCRIPPS CLARK, OF NORCO, CALIFORNIA, ASSIGNOR TO NORCO MFG. CO., OF NORCO, CALIFORNIA, A CORPORATION OF CALIFORNIA.

VALVE SEAL FOR REVOLUBLE-STEM VALVES.

Application filed March 24, 1926. Serial No. 96,945.

My invention relates to an apparatus for sealing revoluble valve stems to prevent unauthorized use of fluid passing through pipe lines.

In water and irrigation systems a great many valves are used in which the stems are provided with polygon extended portions adapted to facilitate the turning of the valve stems and any person may turn the same who has the proper instrument for engaging these polygon shaped portions, usually a wrench.

The principal object of my invention is to provide a means of sealing and securing these valve stems so that they cannot be turned by unauthorized persons; second, to provide an apparatus of this class composed of two hinged members adapted to fit over the polygon shaped portion of the valve stem and lock over the same so that it cannot be turned; third, to provide an apparatus of this class which may be secured in position on the valve stem and sealed so that it is very difficult to remove the seal; fourth, to provide a novel means of sealing valve stems of this class and, fifth, to provide an apparatus of this class which is very simple and economical of construction, easy to install and remove, efficient in its action and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a perspective view of my valve sealing apparatus shown opened and ready to be placed on a valve stem; Fig. 2 is a side elevational view of my sealing device shown positioned on a valve stem and the sealing device shown positioned on a valve stem and the sealing device shown on a smaller scale; and Fig. 3 is a side elevational view of the sealing device alone on a larger scale.

Similar characters of reference refer to similar parts and portions throughout the different views of the drawings.

The closure member 1, arm member 2, closure member 3, arm member 4, rivet 5, chain 6, pin 7 and seal member 8 constitute the principal parts and portions of my valve sealing apparatus. The members 1 and 3 together with their arm members 2 and 4 are made as duplicates and are interchangeable. The portions 1 and 3 are hollow and provided with recesses which are adapted to fit over the polygon shaped head of the valve stem and are provided with small grooves 1ª and 3ª which are adapted to fit around the valve stem below the polygon shaped head. The arm members 2 and 4 are integrally connected respectively with the members 1 and 3 and each provided with a hole intermediate their ends in which is mounted a rivet 5 which is provided with a double head 5ª and 5ᵇ between which is swivelled the one end of a chain 6. This rivet member 5 is riveted at its opposite end from the double head forming a head on the opposite end, thus providing means for pivotally connecting the handle members 2 and 4 together so that the members 1 and 3 may fit together over the polygon head of the valve stem as shown best in Fig. 2 of the drawings. This chain 6 at its opposite end is swivelly connected between a similar double head on the pin 7. This pin 7 however is longer and is provided with a slot 7ª extending therethrough and with a hole 7ᵇ positioned at right angles thereto through said pin. This pin is adapted to be placed in the holes 2ª and 4ª in the extended ends of the arms 2 and 4 and there is provided a seal member 8 which is composed of a piece of tin with one end preferably corrugated as shown and adapted to fit into the slot 7ª after the pin is placed in position in the holes 2ª and 4ª with the arms in alignment with each other. Then a sharpened tool may be inserted in the hole 7ᵇ puncturing the metal of the seal 8, thus securing the seal member in the pin 7 and securely fastening the locking member in position, all as shown best in Fig. 2 of the drawings, and the removal of the seal would flatten the corrugated portion and make its removal easily detected. In case it is desired to turn the valve by one authorized to do so, a pair of pliers are used for withdrawing the seal 8, whereupon the pin 7 may be removed and the extended end of the handles moved relatively to each other as shown best in Fig. 1 of the drawings, whereupon the apparatus may be removed from the valve stem and the valve operated.

Though I have shown and described a particular construction, combination and arrangement of parts and portions, I do not wish to be limited to this particular construction, combination and arrangement but desire to include in the scope of my invention the construction, combination and arrangement substantially as set forth in the appended claims.

Having thus described my invention, what I claim as new and desire to secure by Letters Patent is:

1. In an apparatus for sealing revoluble valve stems, a pair of duplicate members provided with recesses adapted to fit over the extended end of the valve stem and provided with extended arm members, means for pivotally connecting the said arm members together intermediate their ends, and means for sealing the extended ends of the said arms in alignment with each other.

2. In an apparatus for revoluble valve stems, a pair of duplicate recessed members provided with extended arms longer than the recessed portions of said arms pivotally connected together intermediate their ends, said arms provided with holes in their extended ends, and a pin adapted to fit in the extended end of the said arms.

3. In an apparatus of the class described, a pair of members pivotally connected intermediate their ends, each provided near one end with recessed portions adapted to receive the extended end of a valve stem and with a notched portion at said end adapted to receive the valve stem, and means at the opposite ends of said members for holding said members in engagement with each other around the extended portion of the valve stem, comprising a pin mounted in holes in the opposite ends of the said members from the recessed portions, said pin provided with a slot and a seal member adapted to fit in said slot and be sealed therein.

4. In an apparatus of the class described, a pair of duplicate members pivotally connected together intermediate their ends, each provided with a recessed portion at its one end adapted to receive the extended end of a valve stem and with notched portions adapted to receive the valve stem, means for holding said members in engagement with each other around the extended portion of the valve stem, comprising a pin mounted in holes in the opposite ends of said members from the recessed portions provided with a slot in said pin and a hole in the slotted end at right angles to said slot, a corrugated plate seal member adapted to fit tightly in said slot and be punctured through said hole.

5. In an apparatus of the class described, a pair of pivotally connected members adapted to receive between the same and enclose the extended end of a valve stem, each of said members having a hole at one end adapted to be aligned when the end of said valve stem is enclosed by said members, and means for holding said members together, said means comprising a pin mounted in said holes and provided with a slot at one end and a hole in the slotted end at right angles to the slot, a corrugated plate seal member adapted to fit tightly in said slot and to be punched through said hole.

6. In an apparatus of the class described, a pair of sealing members having hollow portions at one end, said hollow portions when positioned adjacent each other being adapted to receive the hand wheel of a valve, said hollow portions communicating with the sides of said members at the extreme ends of the ends mentioned by notched portions adapted to receive the stem of said valve, said hollow portions being provided at the side opposite said notched portions with extended arms pivotally connected intermediate their ends with each other, and means connecting the free ends of said arms together and the adjacent hollow sides of said hollow portions against each other.

In testimony whereof, I have hereunto set my hand at Los Angeles, California, this 16th day of March, 1926.

REX SCRIPPS CLARK.